United States Patent

[11] 3,617,019

| [72] | Inventor | Joseph E. Femia<br>277 Fountain St., Framingham, Mass. 01701 |
|---|---|---|
| [21] | Appl. No. | 25,486 |
| [22] | Filed | Apr. 3, 1970 |
| [45] | Patented | Nov. 2, 1971 |

[54] LOCKING DEVICE FOR PARACHUTE HARNESS QUICK RELEASE
4 Claims, 9 Drawing Figs.
[52] U.S. Cl. .................................................. 244/151, 24/73, 24/201
[51] Int. Cl. .................................................. B64d 17/32
[50] Field of Search .......................................... 244/151, 149, 122, 122.2; 24/73 PH, 201 B, 115.6

[56] References Cited
UNITED STATES PATENTS
1,899,656  2/1933  Wigley et al. .................  244/151
FOREIGN PATENTS
524,963  5/1956  Canada .......................  244/151

Primary Examiner—Milton Buchler
Assistant Examiner—Carl A. Rutledge
Attorneys—Harry M. Saragovitz, Edward J. Kelly, Herbert Berl and Charles C. Rainey ABSTRACT: A locking device for a parachute harness quick release comprises a positive locking means which prevents premature retraction of pins which retain the parachute harness straps. The pins are simultaneously depressed by pressing a button to release a plurality of parachute straps from the pins after unlocking of the pins by the locking means.

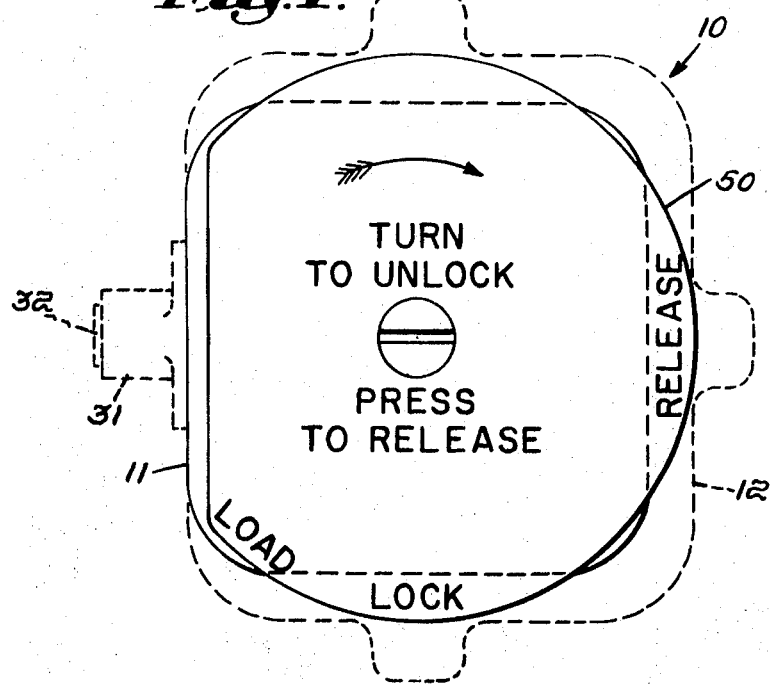
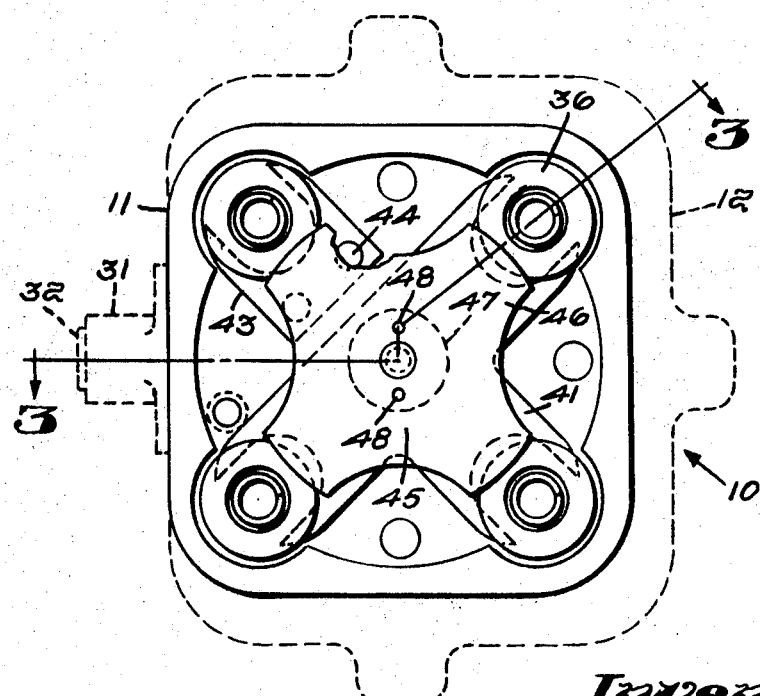

Inventor:
Joseph E. Ferria,
by Harry M. Saragovitz,
Edward J. Kelly, Herbert Berl &
Charles C. Rainey
Attorneys

PATENTED NOV 2 1971

Inventor:
Joseph E. Ferris,
by: Harry M. Saragovitz,
Edward J. Kelly, Herbert Berl &
Charles C. Rainey
Attorneys

LOCKING DEVICE FOR PARACHUTE HARNESS QUICK RELEASE

The invention described herein may be manufactured, used, and licensed by or for the Government for governmental purposes without the payment to me of any royalty thereon.

This invention relates to an improved release mechanism for releasably interconnecting the strap members of a personnel parachute harness. More particularly, the invention relates to a locking disc mounted in such a release mechanism to prevent premature release of the interconnecting harness strap members from the release mechanism.

When personnel are airdropped, there is a possibility that surface winds will cause the parachute to drag the person supported by the parachute during his descent after he has landed, with resulting bodily harm. To avoid this possibility, it has been customary for the armed forces to provide each parachute harness with a quick release for releasing the parachute harness straps to which the parachute is attached and which fit about the torso of the person being airdropped. Such a quick release is described in Military Specification, MIL-Q-43015C, 6 Aug. 1968, "Quick Release, Personnel Parachute Harness." This type of release operates to release the parachute harness straps when a button on the quick release is rapidly depressed by the wearer of the parachute harness. The button is usually struck with one hand and thereby depressed as soon as the person contacts the ground. Depressing the bottom causes retraction of a plurality of locking pins which pass through eyelets attached to the ends of the parachute harness straps so that the eyelets and the harness straps attached thereto are released and the wearer is freed from the parachute harness.

This type of quick release has operated well for years. However, occasionally the locking pins which hold the eyelets of the parachute harness straps become worn on their ends enough to permit the eyelets under tensile forces exerted on the straps to force the pins downwardly enough for the eyelets to escape prematurely while the wearer is in midair. This could result in serious injury or death to the parachutist, particularly if more than one of the harness straps should become unfastened simultaneously.

It is, therefore, an object of the present invention to provide a positive locking device for a release mechanism for releasably interconnecting the strap members of a personnel parachute harness to prevent premature release of the parachute harness straps from the release mechanism.

Other objects and advantages will appear from the following description of the invention, and the novel features will be particularly pointed out pointed out hereinafter in connection with the appended claims.

In the accompanying drawings:

FIG. 1 is a top plan view of the release mechanism of the invention, showing the top surface of the bottom having inscriptions thereon indicating to a parachutist the condition of the locking device and of the release mechanism when the release mechanism is placed on the parachutist's chest with the top surface of the button oriented in a manner in which it would be observed by the parachutist looking down toward his feet.

FIG. 2 is a bottom plan view of the release mechanism with the baseplate removed therefrom looking into the release mechanism from the bottom thereof, showing the locking device in its locking position, the upper portion of the release mechanism in FIG. 2 corresponding with the lower portion of the release mechanism in FIG. 1.

Figure 3:
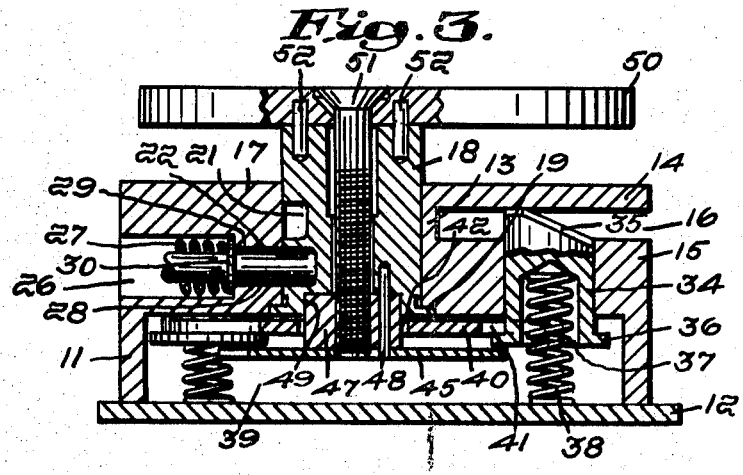
FIG. 3 is a vertical partial sectional view of the release mechanism taken along the line 3—3 in FIG. 2, with the locking device in its "Lock" position and with one of four locking pins of the release mechanism shown partially in section and partially in plan view.
Figure 4:
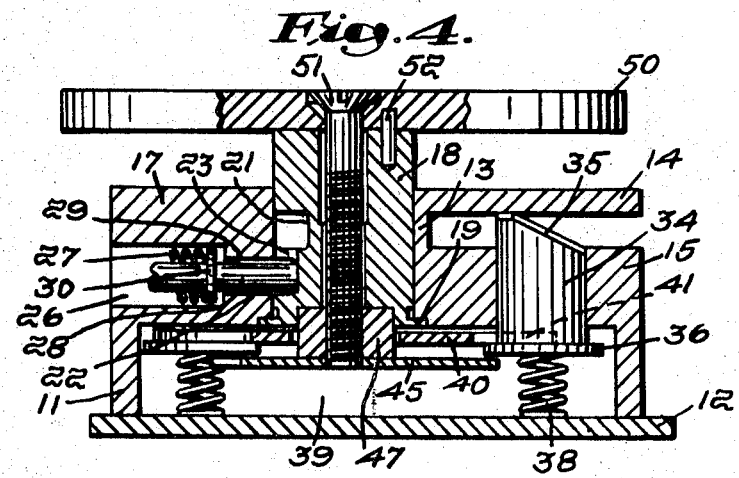

FIG. 4 is a vertical partial sectional view of the release mechanism similar to FIG. 3, but with the button on the release mechanism rotated 90° clockwise from the position shown in FIG. 3 so that the inscription "Release" is at the lower edge of the release mechanism. One of the four locking pins of the release mechanism is shown in plan view. The release mechanism is unlocked and ready to be released when the button is depressed.

Figure 5:
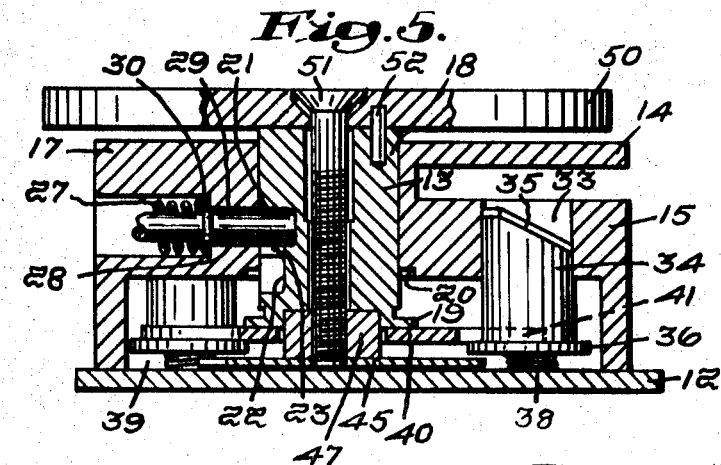

FIG. 5 is a vertical partial sectional view of the release mechanism similar to FIG. 4, but with the button on the release mechanism depressed to acccomplish retraction of the movable locking pins and release of the parachute harness straps.

Figure 6:
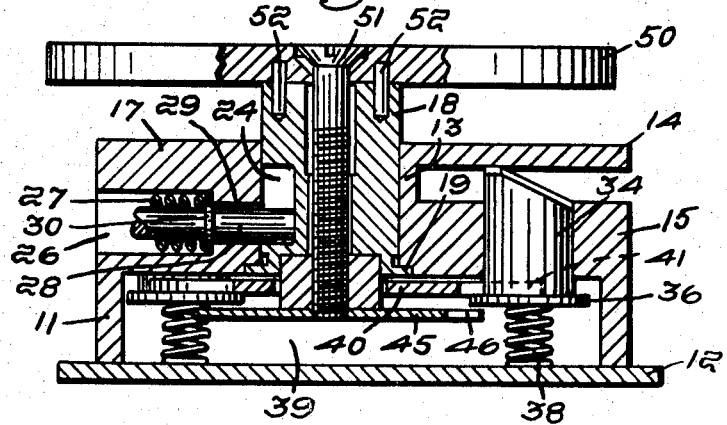

FIG. 6 is a vertical partial sectional view of the release mechanism similar to FIGS. 3, 4 and 5, but with the button rotated counterclockwise through 135° from the position shown in FIGS. 4 and 5 and 45° from the position shown in FIG. 3 to the opposite end of the cam-forming groove until the release mechanism assumes the loading position as indicated by having the inscription "Load" on the top surface of the button in direct line with the eyes of the viewer looking at FIG. 1 and of a parachutist looking down at the release mechanism on his chest. At this position the operating plunger has moved upwardly carrying the button upwardly with it, placing the cam follower in line with the lower portion of the cam-forming groove.

Figure 7:
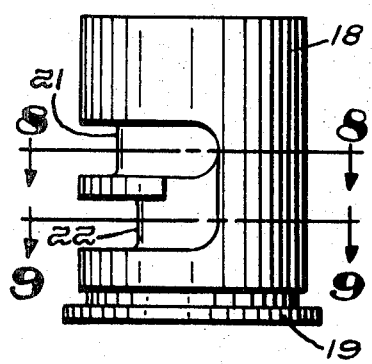

FIG. 7 is a side elevation of the operating plunger when the release mechanism is at the "Lock" position as in FIG. 3.

Figure 8:
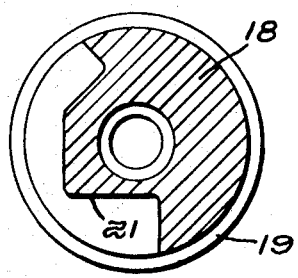

FIG. 8 is a horizontal section of the operating plunger along the line 8—8 of FIG. 7, showing the configuration of the upper portion of the cam.

Figure 9:
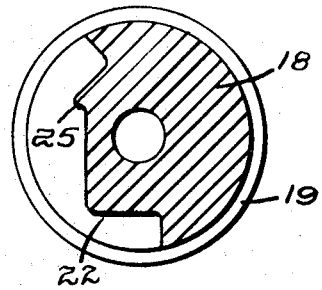

FIG. 9 is a horizontal section of the operating plunger along the line 9—9 of FIG. 7, showing the configuration of the lower portion of the cam.

In the embodiment of the invention illustrated in FIGS. 1—9, a parachute release mechanism represented generally by the numeral 10, comprises a body 11 which has a substantially square top surface with rounded corners and sides normal with respect to the top surface. The bottom of the body is covered by base plate 12 which is attached to the body by means of a plurality of screws (not shown). The body 11 has a cylindrical sleeve portion 13 passing from the top downwardly in the center of the body for a purpose to be described. The body 11 also has an upper portion 14 which forms a shelf separated from a lower portion 15 by a space 16 sufficient to accommodate a plurality of eyelets (not shown) attached to the ends of parachute harness straps by means of which the harness straps are held fastened to the release mechanism. The upper portion 14 and lower portion 15 of the body are connected by means of a narrow column 17, whichalso is joined to sleeve portion 13.

The operating plunger 18, which is substantially cylindrical and has an outwardly flanged portion 19 on the bottom thereof, is journaled in sleeve portion 13 so as to be movable up and down and rotatable therein. Body 11 is provided with an inwardly flanged portion 20 into which outwardly flanged portion 19 on operating plunger 18 fits and which serves as a stop limiting upward movement of the operating plunger. The operating plunger 18 is provided with a cam-forming groove in a portion of its peripheral surface comprising an upper cam portion 21 and a lower cam portion 22 produced by grooves of varying depths, the upper cam portion 21 being connected with the lower cam portion 22 at the ends thereof by means of vertical groove 23 at the "Release" position, as shown in FIGS. 4 and 5 and by means of vertical groove 24 at the "Load" position, as shown in FIG. 6. Lower cam portion 22 has a lip 25 therein between the "Load" position and the "Lock" position for a purpose to be described.

The body 11 is provided with a cylindrical opening 26 in a sidewall thereof adjacent to and below column 17. A cam follower spring 27 is housed within opening 26 and one end of a cam follower 28 in the form of a pin is likewise housed within opening 26 and spring 27. The other end of the cam follower passes through an opening 29, which is a continuation of opening 26 but of a lesser diameter, and extends beyond the inner end of opening 29 into the cam-forming groove when under the bias of spring 27. The cam follower 28 has a flange 30 thereon against which spring 27 applies a bias force to cause cam follower 28 to follow the grooves forming the cam.

Spring 27 extends into cam follower retainer 31, which is mounted on the sidewall of the body. Spring 27 is held in place under compression by adjusting screw 32 threadedly mounted in the end of retainer 31.

Body 11 is provided with a plurality (usually four) of openings 33 in each of which a locking pin 34 is journaled so as to slide up and down within its corresponding opening 33. Each locking pin is cylindrically shaped to fit into an eyelet in the end of a parachute harness strap, has a bevelled surface 35 at its upper end, and an outwardly flanged portion 36 at its lower end. Each locking pin has an opening 37 therein extending upwardly from its lower end to house the upper portion of a locking pin spring 38 within the locking pin. The lower portion of each locking pin spring extends downwardly within a large opening 39 in the body 11 and rests against baseplate 12. The locking pin springs 38 are maintained under sufficient compression to force the locking pins against the upper portion 14 of the body except when sufficient force is applied to the flanged portion 36 or the bevelled surface 35 to overcome the biasing force of the locking pin springs when the release mechanism is unlocked.

Since there are usually four parachute harness straps which are attached to the release mechanism, there are usually four locking pins, the flanged portions 36 of which are shown in FIG. 2. A retractor 40 in the form of a spider having three bifurcated arms 41, the two arms of each of which straddle one of the locking pins adjacent to the flanged portion 36 and fit over the upper surface of the flanged portion 36. The retractor has a circular opening 42 which is coaxial with operating plunger 18. Consequently, when operating plunger 18 is depressed, three of the locking pins 18 are also depressed due to the action of the retractor thereon and the action of the operating plunger on the retractor. Each of these three locking pins may also be individually depressed by inserting an eyelet of a parachute harness strap in space 16, when the parachute release is unlocked, and forcing the individual locking pin downwardly against the bias of spring 38. As soon as the eyelet is coaxial with the locking pin, the locking pin is forced back upwardly through the eyelet by the bias force of the spring 38. This is the action that takes place during loading.

Since it is usually desirable to maintain one of the four parachute harness straps connected to the parachute harness release mechanism, the fourth locking pin is maintained in a stationary position, passing through the eyelet of one parachute harness strap, by means of a stationary locking pin retainer 43 which is attached to body 11 by means of screws 44.

The locking or unlocking of the three movable locking pins is effected by means of locking disc 45 which has four arms 46 and a central flanged portion 47 which is maintained in proper alignment and orientation to the locking disc and the operating plunger by means of two dowel pins 48. The flanged portion 47 passes through opening 42 of the retractor and fits snugly in opening 49 in the bottom of the operating plunger so that when the operating plunger is rotated, the locking disc is rotated along with it and when the operating plunger is depressed, the locking disc is depressed along with it. At certain degrees of rotation of the operating plunger and the locking disc, the ends of arms 46 of the locking disc are under the flanged portions 36 of the locking pins and in position to lock the locking pins in the up position when the release mechanism is in the "Lock" position, as shown in FIG. 3.

The release mechanism is provided with a large button 50 which is attached to the top of the operating plunger by means of screw 51 and is oriented properly by means of dowel pins 52. Screw 51 passes downwardly along the central axis of the operating plunger and is threadedly attached to flanged portion 47 of the locking disc. The dowel pins 48 and 52 maintain the bottom, the operating plunger and the locking disc in proper relation to each other and enable the turning of button 50 in either direction without causing the screw 51 to become loose. The button has inscriptions on its top surface to indicate the three critical settings in which the operating plunger is set and accordingly the positioning of the locking disc with respect to the flanged portions 36 of the locking pins, the positioning of the cam follower with respect to the cam-forming groove, and the positioning of the locking pins (whether retracted or not) and the retractor. The three critical settings are "Load," "Lock," and "Release." The button also has inscriptions directing a parachutist as to how to operate the release mechanism with respect to unlocking it and releasing the parachute straps therefrom.

The operation of the parachute harness release mechanism is carried out in the following manner:

With the release mechanism in the position shown in FIGS. 1, 2 and 3, the locking pins are locked in the raised condition. This is the normal condition when the four harness straps of a personnel parachute harness are attached and locked to the release mechanism, the locking pins passing through the eyelets on the ends of the harness straps, which are not shown in the drawings. The release mechanism lies against the chest of the parachutist with the top surface of the button facing outwardly and the inscription "Turn To Unlock" inverted with respect to the parachutist's feet so that he can look down and read the inscriptions on the button.

When the parachutist has been lowered by his parachute to a short distance above the ground, he will turn the button about 90° clockwise so that the inscription "Release" is directly below his eyes, taking the position formerly occupied by the inscription "Lock." The operating plunger will then be in the position shown in FIG. 4, the cam follower being at the "Release" end of the lower cam portion and in line with vertical groove 23. The arms 46 of the locking disc 45 are under the flanges 36 of the locking pins, but they do not prevent the locking pins from being retracted when the button is pressed to release the harness straps because the operating plunger depresses the locking disc as well as the retractor and the three movable locking pins when it is depressed by pressure on the button. Upon reaching the ground, the parachutist immediately presses the button toward his chest. This causes the operating plunger to move downwardly, as shown in FIG. 5, vertical groove 23 sliding over cam follower 28 so that the cam follower drops into the deeper groove of the upper cam portion 21 at that end of the cam-forming groove. The three movable locking pins are retracted by the downward movement of the retractor 40 when it is forced downwardly by the operating plunger, thus releasing three of the four harness straps. Since the fourth locking pin is held stationary by stationary locking pin retainer 43, the release mechanism is kept attached to the harness by one of the four harness straps, but the harness can be easily removed from the parachutist's body when three of the four harness straps have been released.

When it is desired to place the parachute harness on the parachutist's body again and reconnect the three releasable harness straps to the release mechanism, the button is rotated counterclockwise through about 135° until the inscription "Load" is directly in line with the parachutist's eyes. In so doing, the cam follower follows the upper cam portion 21 to the end thereof opposite to the "Release" end, that is, to the "Load" end, and the vertical groove 24 slides over the cam follower permitting the operating plunger to move upwardly under the influence of the locking pin springs 38, which force the locking pins, as well as the retractor, the operating plunger and the locking disc upwardly. This result is shown in FIG. 6. The arms 46 of the locking disc are midway between the flanges of the locking pins in the "Load" position. Thus, the locking pins are free to be depressed individually by inserting an eyelet of a harness strap against bevelled surface 35 and pushing it until the locking pin moves down and the eyelet passes over the upper end of the locking pin and the locking pin springs back upwardly within the eyelet. If desired, the three movable locking pins may be forced downwardly at the same time by pressing on the button with sufficient force to overcome the bias of all three of the locking pin springs of the movable locking pins when the release mechanism is in the "Load" position.

When loading has resulted in all three movable locking pins being inserted in the eyelets of harness straps, the button is rotated clockwise about 45° until the inscription "Lock" is directly in line with the parachutist's eyes. At this setting, the release mechanism has been returned to the position shown in FIGURES 1, 2 and 3. The arms 46 of the locking disc are again under the flanges 36 of the locking pins, preventing retraction or slippage of the locking pins downwardly. The operating plunger cannot be depressed since there is no vertical groove between the lower and the upper cam portions at this setting. The button and operating plunger cannot be turned back to the "Load" position once they have been rotated to the "Lock" position because of lip 25 over which the cam follower drops when the button is rotated through 45° from the "Load" position to "Lock" position. The only way to return to the "Load" position from the "Lock" position is to carry out the complete sequence of steps described above, going from the "Lock" position to the "Release" position, pressing the button to carry out release, then returning to the "Load" position by rotating the button counterclockwise through about 135° as previously described.

When the button has been rotated to the "Release" position, it is possible to return the button to the "Lock" position without going through with release. Then, when ready for release of the harness straps, the button may again be turned to the "Release" position and depressed at the proper time to effect release of the harness straps.

In the event that it is considered desirable to release all four parachute harness straps from the parachute release mechanism simultaneously, the stationary locking pin retainer 43 may be omitted and the retractor 40 may be provided with four bifurcated arms, the two arms of each of which would straddle one of the four locking pins adjacent to the flanged portion 36 and fit over the upper surface of the flanged portion 36. Thus, when the retractor is moved downwardly by operation of the button and operating plunger, all four locking pins are retracted, releasing the four harness straps simultaneously.

The herein described invention is useful in parachute harness release mechanisms, but may also be useful in release mechanisms for other purposes and applications wherein one or more movable locking pins may be used for holding one or more eyelets or the like and where retraction of the locking pins brings about release of the eyelets and any article attached thereto. It is especially useful in personnel harness releases to prevent premature release of the straps of such harnesses.

It will be understood, of course, that various changes in the details, materials and arrangements of parts which have been herein described and illustrated in order to explain the nature of the invention, may be made by those skilled in the art within the principle and scope of the invention.

I claim:

1. In a release mechanism for releasably interconnecting the strap members of a personnel harness, said release mechanism having a body, a plunger journaled in said body, said plunger having a first end thereof disposed within said body and a second end thereof disposed outside of said body, the portion of said plunger within said body having a cam-forming groove in the peripheral surface thereof, a spring-biased cam follower journaled in said body so as to engage in said cam-forming groove, movement of said plunger relative to said body being defined by cooperation between said cam follower and said cam-forming groove, a plurality of spring-biased pin members journaled in said body member and movable up and down therein for releasably holding a plurality of said strap members, a retractor member comprising a plurality of bifurcated arms, each of said bifurcated arms engaging one of said spring-biased pin members in said body member for causing downward movement thereof upon downward movement of said retractor, and an operating button mounted on said second end of said plunger, that improvement which comprises a locking disc mounted on said first end of said plunger coaxially with said plunger, said locking disc being movable on its axis by the movement of said button and said plunger successively to each of four positions comprising, a first position at which said spring-biased pins are maintained locked by said locking disc and prevented from being depressed, a second position at which said spring-biased pins are unlocked and free to be retracted by said retractor member under force transmitted by said button and said plunger when said button is depressed, a third position at which said button, said plunger, said retractor member, said spring-biased pins, and said locking disc are simultaneously depressed so as to release said plurality of strap members from said spring-biased pins, a fourth position at which said spring-biased pins are unlocked and free to be moved downward in said body member against the biasing force of said springs for connecting said strap members to said release mechanism, and thereafter movement of said button, said plunger, and said locking disc back to said first position.

2. A release mechanism according to claim 1, wherein said personnel harness is a harness for attaching a parachute to a parachutist.

3. A release mechanism according to claim 2, wherein said cam-forming groove comprises means for preventing movement of said button and said plunger from said first position back to said fourth position without first passing through said second and third positions.

4. A release mechanism according to claim 3, wherein said means for preventing movement of said button and said plunger from said first position back to said fourth position without first passing through said second and third positions consists of a lip formed in said cam-forming groove.